(12) United States Patent
Nagatomo et al.

(10) Patent No.: US 9,970,376 B2
(45) Date of Patent: May 15, 2018

(54) FUEL INJECTION CONTROLLER AND FUEL INJECTION SYSTEM

(71) Applicant: DENSO CORPORATION, Kariya, Aichi-pref. (JP)

(72) Inventors: Hiroaki Nagatomo, Kariya (JP); Makoto Tanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days. days.

(21) Appl. No.: 15/037,447

(22) PCT Filed: Nov. 10, 2014

(86) PCT No.: PCT/JP2014/005621
§ 371 (c)(1),
(2) Date: May 18, 2016

(87) PCT Pub. No.: WO2015/075887
PCT Pub. Date: May 28, 2015

(65) Prior Publication Data
US 2016/0298565 A1 Oct. 13, 2016

(30) Foreign Application Priority Data
Nov. 21, 2013 (JP) ................................. 2013-241238

(51) Int. Cl.
*F02D 41/24* (2006.01)
*F02D 41/20* (2006.01)
(Continued)

(52) U.S. Cl.
CPC ......... *F02D 41/2467* (2013.01); *F02D 41/20* (2013.01); *F02D 41/40* (2013.01);
(Continued)

(58) Field of Classification Search
CPC ...... F02D 41/2467; F02D 41/20; F02D 41/40; F02D 2041/2006; F02D 2041/2058;
(Continued)

(56) References Cited

U.S. PATENT DOCUMENTS 5,947,090 A * 9/1999 Maeda .................... F02D 41/20
123/490
9,228,521 B2 * 1/2016 Imai ........................ F02D 41/20
(Continued)

FOREIGN PATENT DOCUMENTS

| JP | 2002-21679 | 1/2002 |
|----|------------|--------|
| JP | 2011-52631 | 3/2011 |

(Continued)

*Primary Examiner* — Joseph Dallo
(74) *Attorney, Agent, or Firm* — Nixon & Vanderhye P.C.

(57) ABSTRACT

A fuel injection controller includes an energization time period calculation portion adapted to calculate an energization time period of a coil responsive to a target injection amount; and a rise control portion adapted to apply a boosted voltage to the coil, along with start of the energization time period, and to raise an current flowing through the coil to a predetermined threshold value. When a range where timing of the current raised to have a peak value at the threshold value appears in accordance with a range of an operating temperature of the coil is defined as a peak appearance range W1, the target injection amount is set such that timing of completion of the energization time period Ti is timing deviated from the peak appearance range W1.

6 Claims, 10 Drawing Sheets

(51) Int. Cl.
*F02D 41/40* (2006.01)
*F02M 51/06* (2006.01)

(52) U.S. Cl.
CPC ... *F02M 51/061* (2013.01); *F02D 2041/2006* (2013.01); *F02D 2041/2058* (2013.01); *F02D 2041/2065* (2013.01); *F02M 51/0671* (2013.01); *F02M 51/0685* (2013.01); *Y02T 10/44* (2013.01)

(58) Field of Classification Search
CPC .......... F02D 2041/2065; F02M 51/061; F02M 51/0685; F02M 51/0671; Y02T 10/44
See application file for complete search history.

(56) References Cited

U.S. PATENT DOCUMENTS

| | | |
|---|---|---|
| 2004/0020473 A1 | 2/2004 | Vogt et al. |
| 2009/0071443 A1 | 3/2009 | Miyake et al. |
| 2010/0263632 A1 | 10/2010 | Miyake et al. |
| 2011/0100333 A1 | 5/2011 | Toyohara et al. |
| 2012/0216783 A1* | 8/2012 | Kusakabe ............... F02D 41/20 123/490 |
| 2012/0318883 A1* | 12/2012 | Kusakabe ............... F02D 41/20 239/1 |
| 2014/0124601 A1* | 5/2014 | Imai ....................... F02D 41/20 239/585.1 |
| 2014/0311459 A1* | 10/2014 | Katsurahara .......... F02D 41/247 123/478 |
| 2016/0237935 A1* | 8/2016 | Tanaka ................. F02D 41/247 |

FOREIGN PATENT DOCUMENTS

| | | | | |
|---|---|---|---|---|
| JP | 2013-124584 | 6/2013 | | |
| JP | 2013108422 A | * | 6/2013 | ........... F02D 41/247 |
| JP | 2013191267 A | * | 9/2013 | ......... G11C 11/5642 |
| JP | 2013234679 A | * | 11/2013 | |
| WO | WO 2013191267 A1 | * | 12/2013 | ......... F02D 41/2467 |

\* cited by examiner

US 9,970,376 B2

FUEL INJECTION CONTROLLER AND FUEL INJECTION SYSTEM

CROSS REFERENCE TO RELATED APPLICATION

This application is the U.S. national phase of International Application No. PCT/JP2014/005621 filed on Nov. 10, 2014 which designated the U.S. and claims priority to Japanese Patent Application No. 2013-241238 filed on Nov. 21, 2013, the entire contents of each of which are incorporated herein by reference Technical Field The present disclosure relates to a fuel injection controller and a fuel injection system for controlling an injection amount of fuel through control of energization time period of a coil in a fuel injector.

Background Art

An ordinary fuel injector is structured to perform valve-opening operations of a valve body through electromagnetic attraction force generated by energization of a coil. Further, a conventional fuel injection controller is adapted to control the energization time period of a coil for controlling the time period for which the valve body is opened and, therefore, for controlling the amount of the fuel injected through a single opening thereof. Specifically, at first, a boosted voltage, which is a voltage boosted by a booster circuit, is applied to the coil, in order to immediately raise the electromagnetic attraction force. Thereafter, at the time point when a current flowing through the coil (the coil current) has been raised to a predetermined threshold value, the application of the boosted voltage is stopped. Then, at the time point when an energization time period responsive to a target injection amount has been reached, the application of a battery voltage to the coil is stopped.

As the coil temperature gets higher, the electric resistance gets higher. Therefore, a characteristic line indicating the relationship between the energization time period and the injection amount is changed in shape, depending on the coil temperature. Therefore, the present inventors have made studies for correcting the energization time period responsive to the target injection amount, according to the coil temperature (temperature correction).

Here, it has been revealed, through tests implemented by the present inventors, that such a characteristic line includes a decrease area and an increase area. In the decrease area, the injection amount with respect to the energization time period is decreased as the coil temperature is higher. In the increase area, the injection amount with respect to the energization time period is increased as the coil temperature is higher. Therefore, it is necessary to determine whether the energization time period responsive to the target injection amount falls in the decrease area or the increase area, and further it is necessary to invert the increase and decrease of the temperature correction based on the result of the determination.

However, for example, even the slight deviation of the assumed characteristic line from the actual characteristic line causes a different determination result as to whether the energization time period is in the decrease area or the increase area. If the determination is wrong, the increase and decrease of the temperature correction is performed inversely. There is a concern that the actual injection amount is erroneously corrected from the target injection amount.

PRIOR ART LITERATURES

Patent Literature

[Patent Literature 1] JP 2011-94562-A

SUMMARY OF INVENTION

An object of the present disclosure is to provide a fuel injection controller and a fuel injection system which are enabled to control the injection amount with higher accuracy.

According to an aspect of the present disclosure, a fuel injection controller is applied to a fuel injector adapted to perform a valve-opening operation of a valve body through electromagnetic attraction force generated by energization of a coil for injecting a fuel for use in combustion in an internal combustion engine.

Further, the fuel injection controller includes a target injection amount setting portion adapted to set a target injection amount of fuel through a single opening of the fuel injection valve; an energization time period calculation portion adapted to an energization time period calculation portion adapted to set a base value of an energization time period of the coil responsive to the target injection amount and to correct the base value according to a temperature of the coil to calculate the energization time period; a booster circuit adapted to boost a battery voltage; and a rise control portion adapted to apply to the coil a boosted voltage which is a voltage boosted by the booster circuit, along with start of the energization time period, and to raise a current flowing through the coil to a predetermined threshold value. When a range where timing of the current raised to have a peak value at the threshold value appears in accordance with a range of an operating temperature of the coil is defined as a peak appearance range, the target injection amount setting portion sets the target injection amount such that timing of completion of the energization time period is timing deviated from the peak appearance range.

The characteristic line indicating the relationship between the energization time period and the injection amount includes an increase area in which the injection amount increases as the temperature is higher, and a decrease area in which the injection amount decreases as the temperature is higher. Further, the present inventors have obtained the founding that "the boundary between the increase area and the decrease area exists in a peak appearance range".

In the aforementioned disclosure, the timing of the completion of the energization time period is set to be timing deviated from the peak appearance range. Therefore, in correcting the base value of the energization time period responsive to the target injection amount according to the temperature, it is possible to determine whether increase correction is performed or decrease correction is performed as the temperature gets higher. This can eliminate the necessity of changing over between performing increase correction and performing decrease correction as the temperature gets higher, for the same target injection amount. The concern about inverting increases and decreases of corrections can be eliminated in correcting the base value of energization time period responsive to the coil temperature. The injection amount of fuel can be controlled with higher accuracy, based on the characteristic lines provided in consideration of the coil temperature.

Further, according to another aspect of the present disclosure, a fuel injection controller includes a target injection amount setting portion adapted to set a target injection amount of the fuel through a single opening of the fuel injection valve; an energization time period calculation portion adapted to set a base value of an energization time period of the coil responsive to the target injection amount and to correct the base value according to a temperature of the coil to calculate the energization time period; a booster circuit adapted to boost a battery voltage; a rise control portion adapted to apply to the coil a boosted voltage which is a voltage boosted by the booster circuit, along with start of the energization time period, and to raise a current flowing through the coil to a predetermined threshold value. When a point where characteristic lines indicating relationships between the energization time period and the injection amount at different coil operating temperatures are intersected with each other is defined as a cross point, and a range where the cross point appears in accordance with a range of the operating temperature of the coil is defined as a cross-point appearance range, the target injection amount setting portion sets the target injection amount such that timing of completion of the energization time period is timing deviated from the cross-point appearance range.

The boundary between the increase area and the decrease area in the characteristic line corresponds to the cross point where the respective characteristic lines at the different coil operating temperatures are intersected with each other. In the aforementioned disclosure, the timing of the completion of the energization time period is set to be timing deviated from the cross-point appearance range. Therefore, in correcting the base value of energization time period responsive to the target injection amount according to the temperature, it is possible to determine whether increase correction is performed or decrease correction is performed as the temperature gets higher. This can eliminate the necessity of changing over between performing increase correction and performing decrease correction as the temperature gets higher, for the same target injection amount. The concern about inverting increases and decreases of the amounts of corrections can be eliminated in correcting the base value of energization time period according to the coil temperature. The fuel injection amount can be controlled with higher accuracy, based on the characteristic lines provided in consideration of the coil temperature.

BRIEF DESCRIPTION OF DRAWINGS

The aforementioned object and other objects, characteristics and advantages of the present disclosure will be more apparent from the following detailed description, with reference to the accompanying drawings.

EMBODIMENTS FOR CARRYING OUT INVENTION

Figure 1:
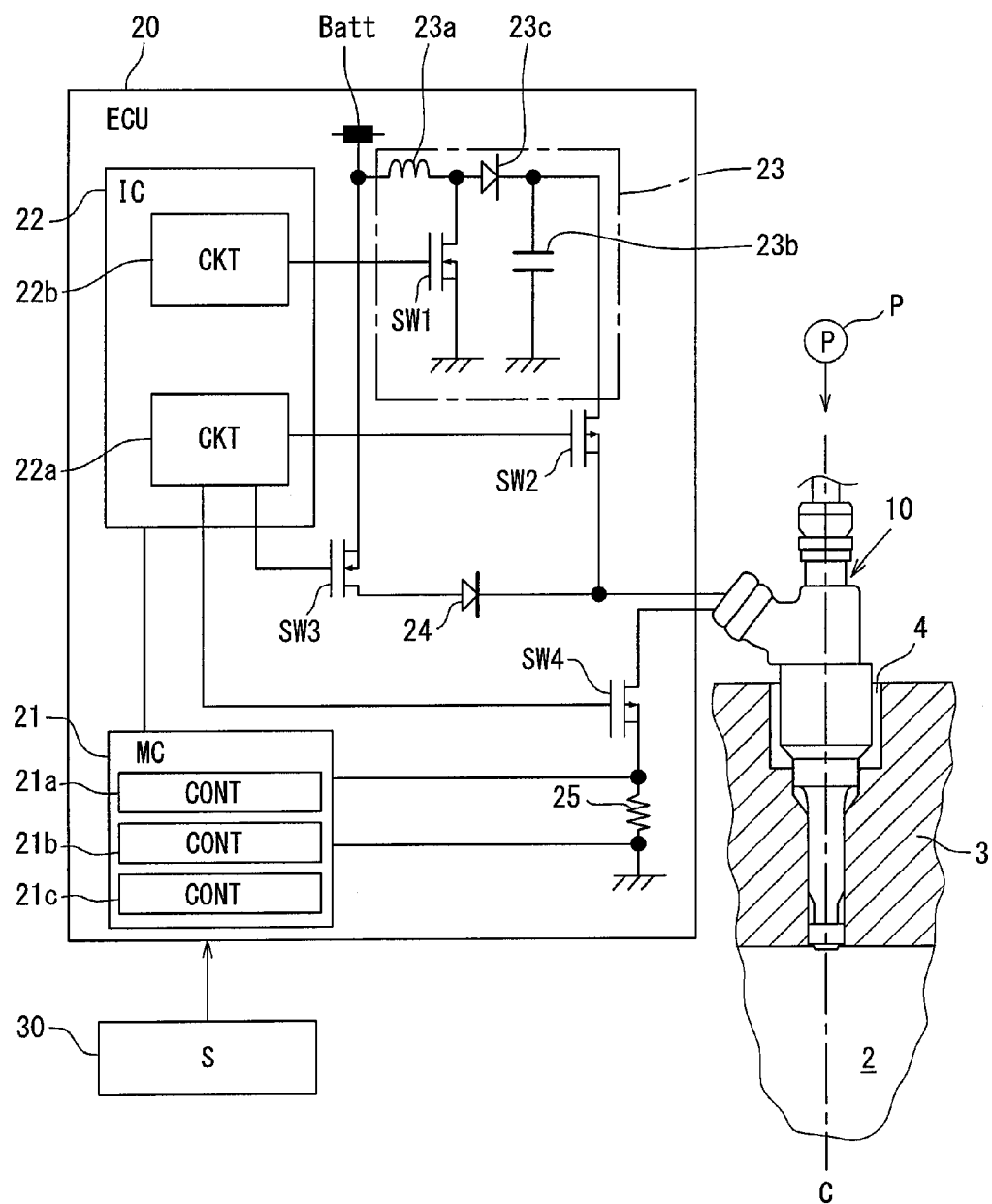
FIG. 1 is a schematic view illustrating a fuel injection controller, and a fuel injection system having the fuel injection controller, according to the first embodiment of the present disclosure.

Hereinafter, a plurality of embodiments will be described with reference to the drawings. In each of the embodiments, parts corresponding to matters which have been described in a preceding embodiment are designated by the same reference characters and may not been described redundantly in some cases. In each of the embodiments, when a part of a configuration is described, another preceding embodiment may be applied to the other parts of the configuration, by making reference thereto.

First Embodiment

A fuel injector 10 shown in FIG. 1 is mounted in an internal combustion engine (gasoline engine) and injects a fuel directly to a combustion chamber 2 in the internal combustion engine. Specifically, a cylinder head 3 which forms the combustion chamber 2 is provided with a mounting hole 4 for receiving the fuel injector 10. The fuel to be supplied to the fuel injector 10 is transferred while being pressurized by a fuel pump P, and the fuel pump P is driven by rotational driving force of the internal combustion engine.

Figure 2:
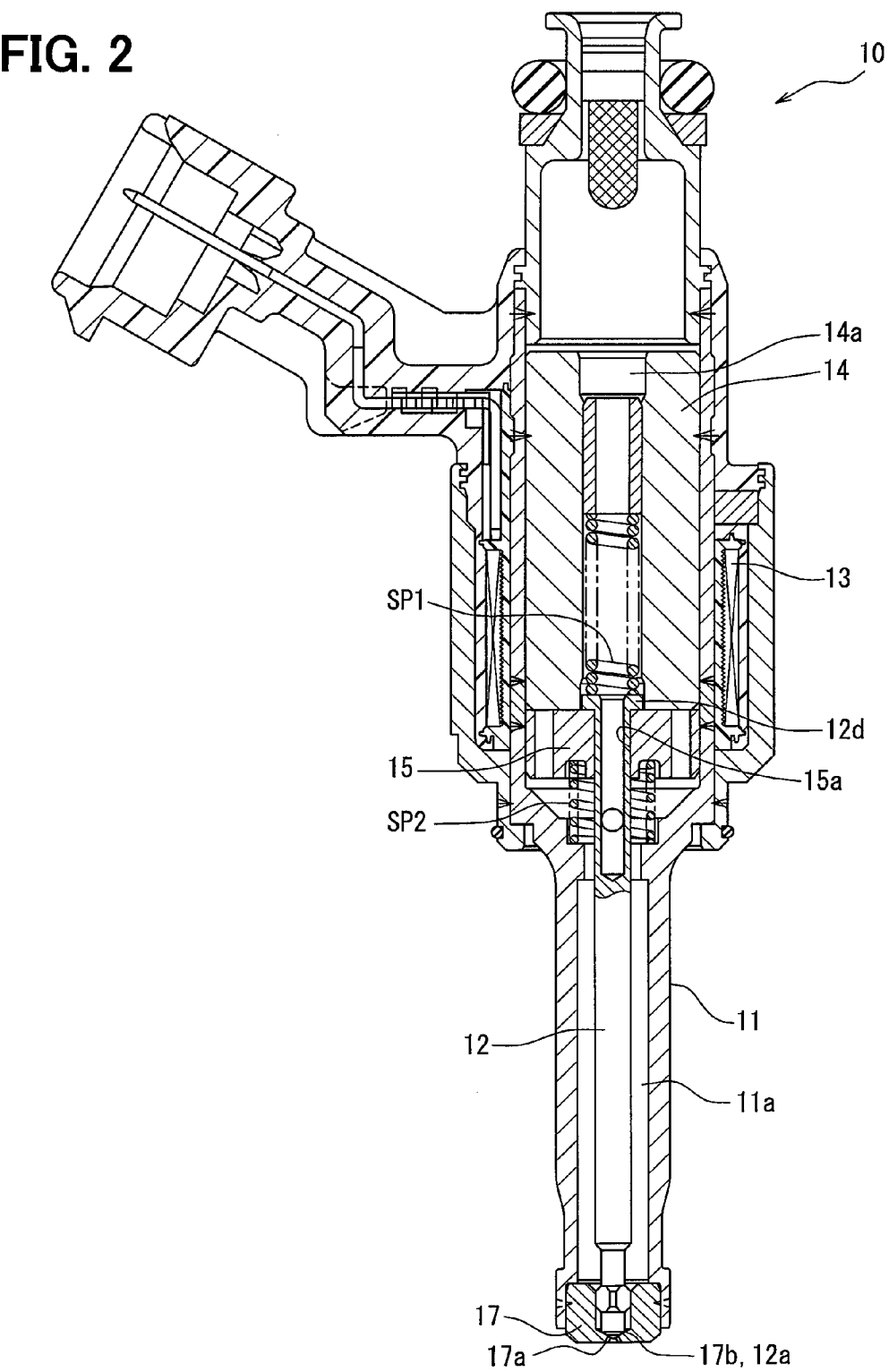
FIG. 2 is a cross-sectional view illustrating the entire structure of a fuel injector according to the first embodiment.

As illustrated in FIG. 2, the fuel injector 10 includes a body 11, a valve body 12, a coil 13, a stator core 14, a movable core 15, an injection hole body 17, and the like. The body 11 is formed of a metal magnetic material and includes a fuel path 11a. The body 11 houses therein the valve body 12, the stator core 14, and the movable core 15, and holds the injection hole body 17.

The injection hole body 17 is provided with a seating surface 17b for causing the valve body 12 to separate therefrom and seat thereon, and an injection hole 17a for injecting fuel therethrough. If the valve body 12 is caused to perform a valve-closing operation such that a seat surface 12a formed in the valve body 12 is seated on the seating surface 17b, the injection of the fuel from the injection hole 17a is stopped. If the valve body 12 is caused to perform a valve-opening operation (lifted up) such that the seat surface 12a is separated from the seating surface 17b, the fuel is injected from the injection hole 17a.

The stator core 14 is formed into a cylindrical shape using a metal magnetic material and includes a fuel path 14a inside the cylinder. The movable core 15 is formed into a disk shape using a metal magnetic material and is disposed to face the stator core 14 so as to form a predetermined gap between the movable core 15 and the stator core 14 during de-energization of the coil 13. The stator core 14 and the movable core 15 form a magnetic circuit which forms a path for magnetic fluxes generated by the energization of the coil 13.

If the energization of the coil 13 is performed for generating an electromagnetic attraction force in the stator core 14, the movable core 15 is attracted to the stator core 14 due to the electromagnetic attraction force. As a result, the valve body 12 coupled to the movable core 15 is caused to lift up (to perform a valve-opening operation), against the fuel-pressure valve-closing force and the elastic force of a main spring SP1 which will be described later. On the other hand, if the energization of the coil 13 is stopped, the valve body 12 performs a valve-closing operation together with the movable core 15 by the elastic force of the main spring SP1.

The movable core 15 is provided with a through hole 15a, and the valve body 12 is inserted into the through hole 15a. The valve body 12 is assembled to the through hole 15a such that the valve body 12 is slidable relative to the movable core 15. The valve body 12 is provided with an engagement portion 12d at its end portion in the opposite side from the injection hole. When the movable core 15 is moved by being attracted to the stator core 14, the engagement portion 12d is moved in the state of being engaged with the movable core 15, so that the valve body 12 also moves (performs a valve-opening operation) along with the movement of the movable core 15. However, even in a state where the movable core 15 is in contact with the stator core 14, the valve body 12 can move relative to the movable core 15 to lift up.

The main spring SP1 is disposed on the valve body 12 in its opposite side from the injection hole, while a sub spring SP2 is disposed on the movable core 15 in its injection-hole side. These springs SP1 and SP2 have coil shapes and elastically deform in the direction of a center axis line C. The elastic force (main elastic force Fs1) of the main spring SP1 is applied to the valve body 12 in the valve-closing direction. The elastic force (sub elastic force Fs2) of the sub spring SP2 is applied to the movable core 15 in the valve-opening direction.

The valve body 12 is provided between the main spring SP1 and the seating surface 17b, while the movable core 15 is provided between the sub spring SP2 and the engagement portion 12d. Further, the elastic force Fs2 of the sub spring SP2 is transmitted to the engagement portion 12d through the movable core 15 and is applied to the valve body 12 in the valve-opening direction. Accordingly, the elastic force Fs obtained by subtracting the sub elastic force Fs2 from the main elastic force Fs1 is applied to the valve body 12 in the valve-closing direction.

An electronic control unit (ECU) 20 includes a microcomputer 21, an integrated circuit (IC) 22, a booster circuit 23, switching elements SW2, SW3 and SW4, and the like. The ECU 20 provides a fuel injection controller for controlling the operation of the fuel injector 10 to control the fuel injection amount. Further, the ECU 20 and the fuel injector 10 provide a fuel injection system for injecting an optimum amount of the fuel.

Figure 3:
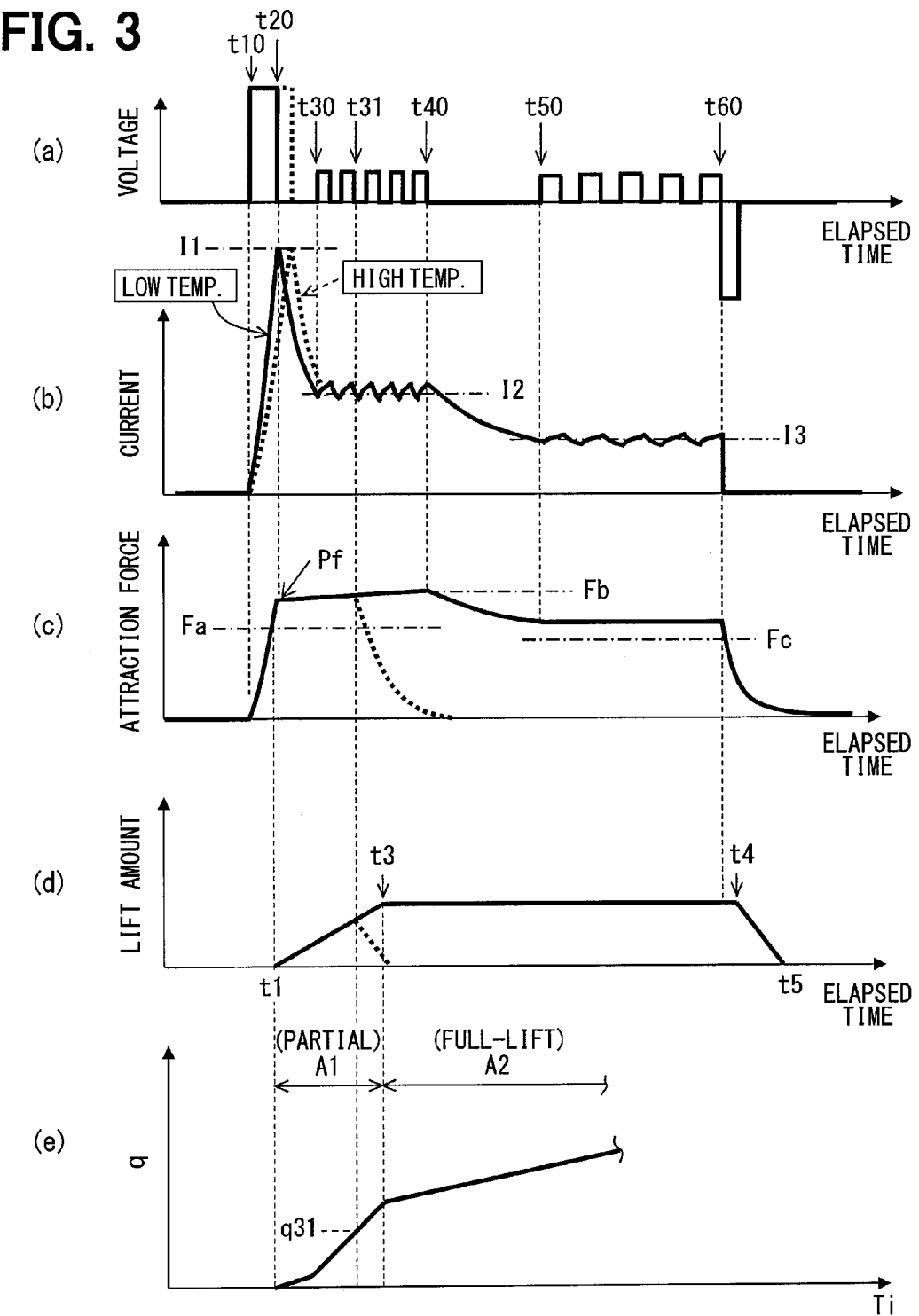
FIG. 3 is a chart illustrating changes in a voltage applied to a coil, a coil current, an electromagnetic attraction force, and a lift amount along with the elapse of time, and the relationship between an energization time period and an injection amount, in a case where injection control is performed according to the first embodiment.

The microcomputer 21 includes a central processing device, a nonvolatile memory, a volatile memory and the like and calculates a target injection amount of fuel and target timing of start of injection, based on the engine rotating speed and the load of the internal combustion engine. Further, an injection characteristic (a Ti-q characteristic line) indicating the relationship between the energization time period Ti and the injection amount q is preliminarily acquired through tests. Further, according to the injection characteristic, the energization time period Ti of the coil 13 is controlled to control the injection amount q. In FIG. 3(a) which will be described later, a reference character "t10" designates the timing of start of the energization time period, and a reference character "t60" designates the timing of the completion of the energization time period.

The IC 22 includes an injection driving circuit 22a for controlling the operations of the switching elements SW2, SW3, and SW4, and a charging circuit 22b for controlling the operation of the booster circuit 23. These circuits 22a and 22b perform operations based on an injection command signal outputted from the microcomputer 21. The injection command signal is a signal commanding a state of energization of the coil 13 in the fuel injector 10 and is set by the microcomputer 21, based on the target injection amount and the target timing of start of injection which have been described above, and based on a coil current detected value I which will be described later. The injection command signal includes an injection signal, a boost signal, and a battery signal, which will be described later.

The booster circuit 23 includes a coil 23a, a capacitor 23b, a diode 23c, and a switching element SW1. If the charging circuit 22b controls the switching element SW1 such that the switching element SW1 repeatedly performs an ON-operation and an OFF-operation, a battery voltage supplied from a battery terminal Batt is raised (boosted) by the coil 23a, and the raised battery voltage is accumulated in the capacitor 23b. The voltage of the electric power having been boosted and accumulated as described above corresponds to "a boosted voltage".

If the injection driving circuit 22a causes both the switching elements SW2 and SW4 to perform an ON-operation, the boosted voltage is applied to the coil 13 in the fuel injector 10. On the other hand, if a changeover is performed to cause the switching element SW2 to perform an OFF-operation, while causing the switching element SW3 to perform an ON-operation, the battery voltage is applied to the coil 13 in the fuel injector 10. In order to stop the application of the voltage to the coil 13, the switching elements SW2, SW3, and SW4 are caused to perform an OFF-operation. The diode 24 is for preventing the boosted voltage from being applied to the switching element SW3, when the switching element SW2 is performing an ON-operation.

A shunt resistance 25 is for detecting a current flowing through the switching element SW4, that is, a current (coil current) flowing through the coil 13. The microcomputer 21 detects the coil current detected value I, based on the amount of the voltage drop generated in the shunt resistance 25.

Next, the electromagnetic attraction force (the valve opening force) generated by flow of the coil current will be described in detail.

The electromagnetic attraction force increases with increasing magnetomotive force (ampere turn) generated by the stator core 14. In other words, with the same number of windings of the coil 13, the electromagnetic attraction force is increased, as the coil current is increased to increase the ampere turn. However, it takes time to saturate the attraction force to a maximum value, after the start of the energization. In the present embodiment, the electromagnetic attraction force which has been saturated to have the maximum value is referred to as a static attraction force Fb.

Further, the electromagnetic attraction force required for starting a valve opening operation of the valve body 12 is referred to as a necessary valve opening force Fa. Further, the electromagnetic attraction force required for starting a valve opening operation of the valve body 12 (the necessary valve opening force) is increased, as the pressure of the fuel supplied to the fuel injector 10 is higher. Further, the necessary valve opening force is increased depending on various conditions such as an increase in viscosity of fuel. Therefore, the necessary valve opening force Fa is defined by the maximum value of the necessary valve opening force in the case of assuming a condition where the necessary valve opening force is largest.

FIG. 3(a) illustrates a waveform of the voltage applied to the coil 13, in a case where the valve body 12 is opened once to inject the fuel. Further, in FIGS. 3(a) and 3(b), a solid line indicates a waveform when the coil 13 is at a room temperature, and a dotted line indicates a waveform when the coil 13 is at a higher temperature.

As illustrated in FIGS. 3(a) and 3(b), at voltage-application starting timing (see t10) commanded by the injection command signal, the boosted voltage is applied to the coil to start the energization. Then, the coil current rises along with the start of the energization (see FIG. 3(b)). Further, at a time point when the coil current detected value I has reached a first target value I1 (see t20), the energization is turned OFF. In other words, the energization is controlled such that the coil current is raised to the first target value I1 through the application of the boosted voltage by the initial energization. The microcomputer 21 performing this control corresponds to "a rise control portion 21a". Further, the first target value I1 corresponds to "a predetermined threshold value".

Thereafter, the energization by the battery voltage is controlled such that the coil current is maintained at a second target value I2 which is set to be a lower value than the first target value I1. Specifically, the energization by the battery voltage is repeatedly turned ON and OFF such that the difference between the coil current detected value I and the second target value I2 falls within a predetermined range, thereby controlling the duty to maintain the average value of the varying coil current at the second target value I2. The microcomputer 21 performing this control corresponds to "a constant-current control portion 21b". The second target value I2 is set to be a value which makes the static attraction force Fb larger than the necessary valve opening force Fa.

Thereafter, the energization by the battery voltage is controlled such that the coil current is maintained at a third target value I3 which is set to be a lower value than the second target value I2. Specifically, the energization by the battery voltage is repeatedly turned ON and OFF such that the difference between the coil current detected value I and the third target value I3 falls within a predetermined range, thereby controlling the duty to maintain the average value of the varying coil current at the third target value I3. The microcomputer 21 performing this control corresponds to "a holding control portion 21c".

As illustrated in FIG. 3(c), the electromagnetic attraction force continuously rises for a time period from the energization starting time point, namely the rising control starting time point (t10), to a constant-current control completion time point (t40). The rising speed of the electromagnetic attraction force in the constant current control time period is lower than that in the rising control time period. The attraction force is maintained at a predetermined value in a holding control time period (t50 to t60). The third target value I3 is set such that the predetermined value is larger than a valve-opening holding force Fc required for holding the valve opening state. Further, the valve-opening holding force Fc is smaller than the necessary valve opening force Fa.

The injection signal, which is included in the injection command signal, is a pulse signal commanding the energization time period Ti. The injection signal has a pulse-on timing which is set at the timing (t10) earlier than the target injection starting timing by a predetermined injection delay time. Further, the injection signal has a pulse-off timing which is set at the energization completion timing (t60) after the elapse of the energization time period Ti since the pulse-on. The switching element SW4 is operated according to the injection signal.

The boost signal, which is included in the injection command signal, is a pulse signal commanding turn-on and turn-off of the energization through the boosted voltage, and has pulse-on at the same time as the pulse-on of the injection signal. Thereafter, the boost signal is kept being ON for a time period until the coil current detected value I reaches the first target value I1. Thus, the boosted voltage is applied to the coil 13 during the rising control time period.

The battery signal, which is included in the injection command signal, performs pulse-on at the time point t30 at which the constant current control starts. Thereafter, the battery signal is repeatedly turned ON and OFF such that feedback control is performed for maintaining the coil current detected value I at the second target value I2, for the time period until the time elapsed since the start of the energization reaches a predetermined time period. Thereafter, the battery signal is repeatedly turned ON and OFF such that feedback control is performed for maintaining the coil current detected value I at the third target value I3 for the time period until the pulse-off of the injection signal. The switching element SW3 is operated according to the battery signal.

As illustrated in FIG. 3(d), at the time point when the injection delay time has elapsed since the energization starting time point (t10), namely at the time point t1 when the attraction force has reached the necessary valve opening force Fa, the valve body 12 starts a valve opening operation. In FIG. 3(d), a reference character t3 indicates the timing when the valve body 12 has reached a maximum valve-opening position (a full-lift position) and a reference character t4 indicates the timing when the valve body 12 starts valve-closing. Further, at the time point when a delay time has elapsed since the energization completion timing (t60), namely at the time point t4 when the attraction force has lowered to the valve-opening holding force Fc, the valve body 12 starts a valve-closing operation.

Further, in the example of FIG. 3(a), a voltage inversed in polarity is applied to the coil 13 at the same time as the injection completion command timing. Thus, a coil current flows in the opposite direction from a direction of the coil current during the energization time period Ti (t10 to t60), thereby increasing the valve-closing speed of the valve body 12. In other words, it is possible to shorten the valve-closing delay time period from the energization completion timing t60 to the time point t5 at which the valve body 12 has seated to complete valve-closing. This application of the inversed voltage after the energization completion timing t60 is not included in the energization time period Ti which is calculated by an energization time period calculation portion S40 which will be described later, and also is not included in the energization time period Ti in the Ti-q characteristic line.

FIG. 3(e) illustrates a characteristic line indicating the relationship between the energization time period Ti and the injection amount q, such that the energization time period Ti is coincident with the elapsed time period in FIGS. 3(a) to 3(d). For example, a time point t31 (see FIG. 3(a)) in the middle of holding the coil current at the second target value I2 is set to be the timing of completion of the energization time period for turning OFF the pulse of the injection signal. Then, as indicated by dotted lines in FIGS. 3(c) and 3(d), at the time point t31, the attraction force starts to decrease and the valve body 12 starts a valve-closing operation. In this case, the injection amount is an injection amount q31 at t31 in the characteristic line illustrated in FIG. 3(d).

Further, the pressure of the fuel supplied to the fuel injector 10 (fuel pressure Pc) is detected by a fuel pressure sensor 30 illustrated in FIG. 1. The ECU 20 determines whether or not the constant current control is performed according to the fuel pressure Pc detected by the fuel pressure sensor 30. For example, if the fuel pressure Pc is equal to or more than a predetermined threshold value Pth, the ECU 20 permits the constant current control. On the other hand, if the fuel pressure Pc is lower than the predetermined threshold value Pth, the constant current control is not performed, and the holding control is performed after the rising control, because the electromagnetic attraction force required for starting a valve-opening operation is smaller.

Further, as illustrated in FIGS. 3(d) and 3(e), after the time point t3 when the valve body 12 has reached the maximum valve-opening position, the Ti-q characteristic line decreases in inclination. In the Ti-q characteristic line, the area corresponding to the time period from t1 to t3 is referred to as "a partial area A1", and the area after t3 is referred to as "a full-lift area A2". In other words, in the partial area A1, the valve body 12 starts a valve-closing operation before reaching the maximum valve-opening position, and then a smaller amount of the fuel (see the reference character q31) is injected.

Figure 4:
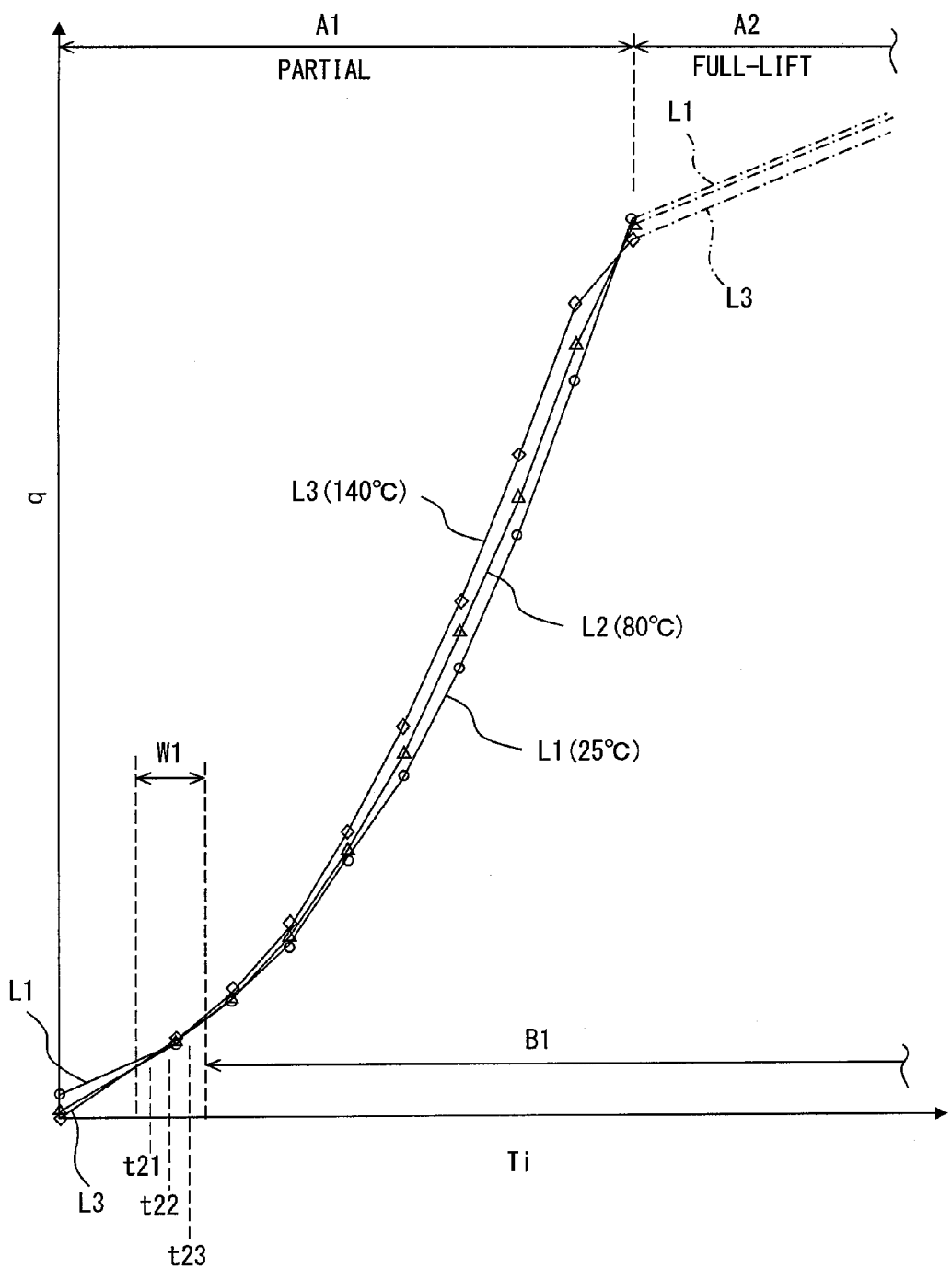
FIG. 4 is a view illustrating characteristic lines indicating the relationship between the energization time period and the injection amount, wherein the characteristic lines have different shapes depending on the coil temperature.

If the temperature of the coil 13 changes, the resistance value of the coil 13 is also changed and, therefore, the Ti-q characteristic line is also changed in shape. FIG. 4 illustrates results of tests indicating the shape of the Ti-q characteristic line which changes with the temperature. In FIG. 4, a characteristic line L1 represents results of tests implemented at a room temperature. A characteristic line L2 represents results of tests implemented in a state a current flows to the coil 13 through a resistance at about 80° C. A characteristic line L3 represents results of tests implemented in a state a current flows to the coil 13 through a resistance at about 140° C.

From the results of these tests, the present inventors have obtained findings as follows. In the partial area A1, in the area having a shorter energization time period than a peak appearance range W1 which will be described later (a decrease area), the injection amount with respect to the energization time period is decreased as the temperature of the coil is higher. On the other hand, in the partial area A1, in the area having a longer energization time period than the peak appearance range W1 (an increase area), the injection amount with respect to the energization time period is increased as the temperature of the coil is higher.

Figure 5:
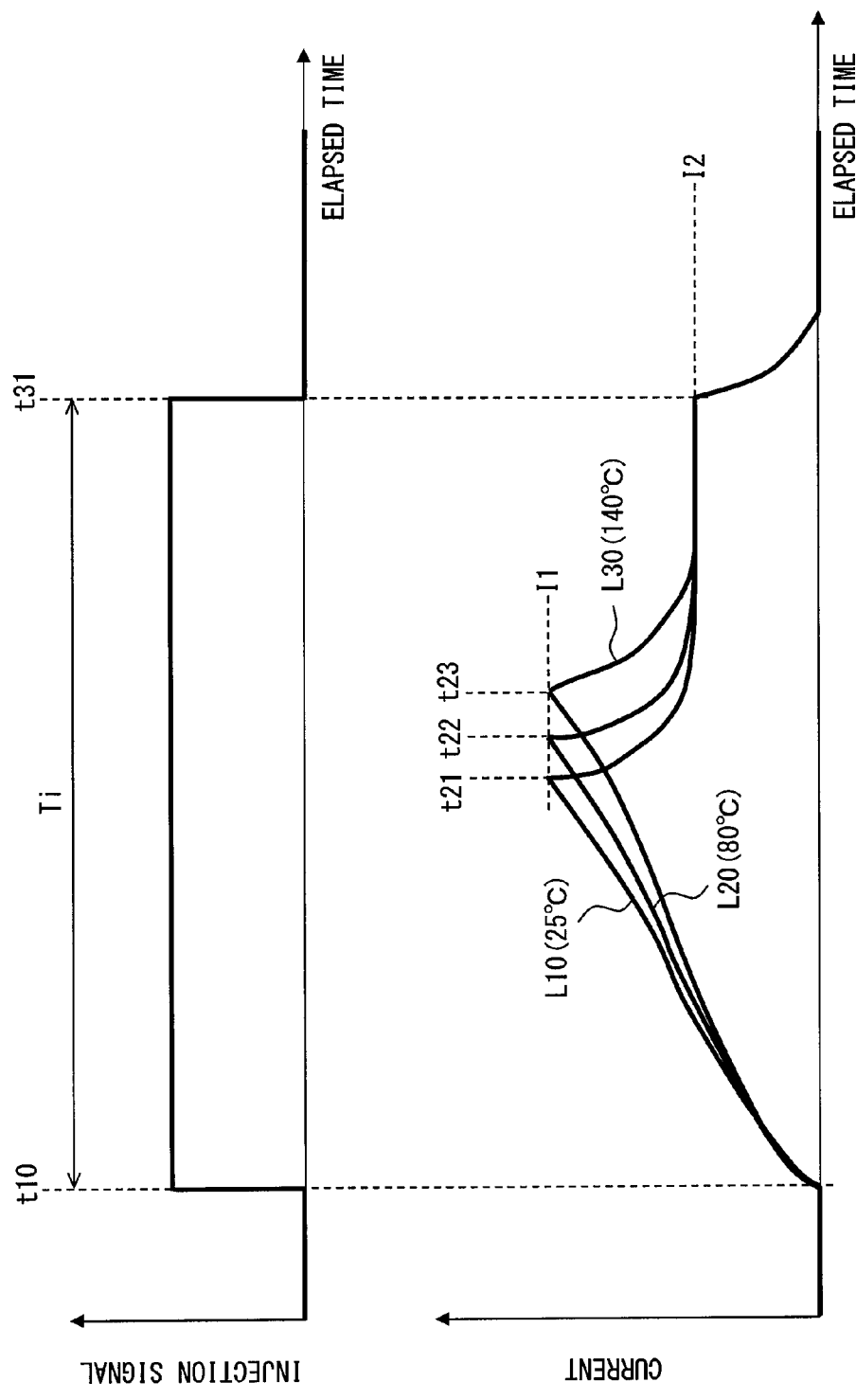
FIG. 5 is a view illustrating a current waveform indicating the change of the coil current along with the elapse of time, wherein the current waveform has a different shape depending on the coil temperature.

Next, the peak appearance range W1 will be described. FIG. 5 illustrates results of measurements implemented by testing the change of the coil current (the current waveform) generated by the control through the rise control portion 21a and the constant current control portion 21b. In these tests, the energization is completed at the time point t31 when the coil current had been held at the second target value I2 by the constant-current control portion 21b, and the energization time period Ti responsive to an injection amount in the partial area A1 is set.

In FIG. 5, a current waveform L10 represents results of tests implemented at a room temperature. A current waveform L20 represents results of tests implemented in a case where a current flows to the coil 13 through a resistance at about 80° C. A current waveform L30 represents results of tests implemented in a case where a current flows to the coil 13 through a resistance at about 140° C. In FIG. 5, reference characters t21, t22, and t23 indicate the timings at which the currents have respective peak values, since the rise control portion 21a has been completed to stop the application of the boosted voltage.

As illustrated in FIG. 5, as the coil temperature is higher, the time period required for causing the current to reach the first target value I1 is made longer, and the peak value appears at later timing. This is because the resistance of the coil 13 is made higher as the coil temperature is higher. Accordingly, if the energization is completed before the peak value appearance timing t21, t22, t23, the injection amount with respect to the energization time period Ti is decreased as the coil temperature is higher. In other words, when the energization time period Ti is in the shorter time-period side with respect to the peak appearance range W1 in FIG. 4, the characteristic line L1 at the lower temperature, out of the three characteristic lines L1, L2 and L3, is positioned above the characteristic line L3 at the higher temperature.

However, in the partial area A1, if the energization is completed after the peak value appearance timing t21, t22, t23, the energization is completed immediately after the peak value appearance timing t23 in the case of the current waveform L30 at the higher temperature. Therefore, there is a larger amount of magnetic fluxes left at the time of the completion of the energization, which decreases the valve closing speed of the valve body 12. Accordingly, the actual valve-opening time period increases, thereby increasing the injection amount. On the contrary, in the case of the current waveform L10 at the lower temperature, there is a longer time period from the peak value appearance timing t21 to the completion of the energization, in comparison with the case of the higher temperature. Therefore, there is a smaller amount of magnetic fluxes left at the time of the completion of the energization, which makes the valve closing speed of the valve body 12 higher than in the case of the higher temperature. Accordingly, the actual valve-opening time period shortens compared to the case of the higher temperature, thereby decreasing the injection amount.

In other words, in the partial area A1, when the energization time period Ti is in the longer time-period side with respect to the peak appearance range W1 in FIG. 4, the characteristic line L3 at the higher temperature, out of the three characteristic lines L1, L2, and L3, is positioned above the characteristic line L1 at the lower temperature. In other words, when the energization time period Ti is set to be shorter than the peak appearance range W1, the injection amount with respect to the energization time period is decreased as the coil temperature is higher. On the other hand, when the energization time period Ti is set to be longer than the peak appearance range W1, the injection amount with respect to the energization time period is increased as the coil temperature is higher. In other words, the increase and decrease of the injection amount with respect to the energization time period Ti which depend on the temperature are inversed, with the peak appearance range W1 being the boundary.

In the present embodiment, the energization time period Ti is set to be in the area designated by a reference character B1 in FIG. 4, such that the timing t31 and the timing t60 of the completion of the energization time period Ti are timing later than the peak appearance range W1. Hereinafter, a process of calculating the energization time period Ti will be described with reference to FIG. 6.

Figure 6:
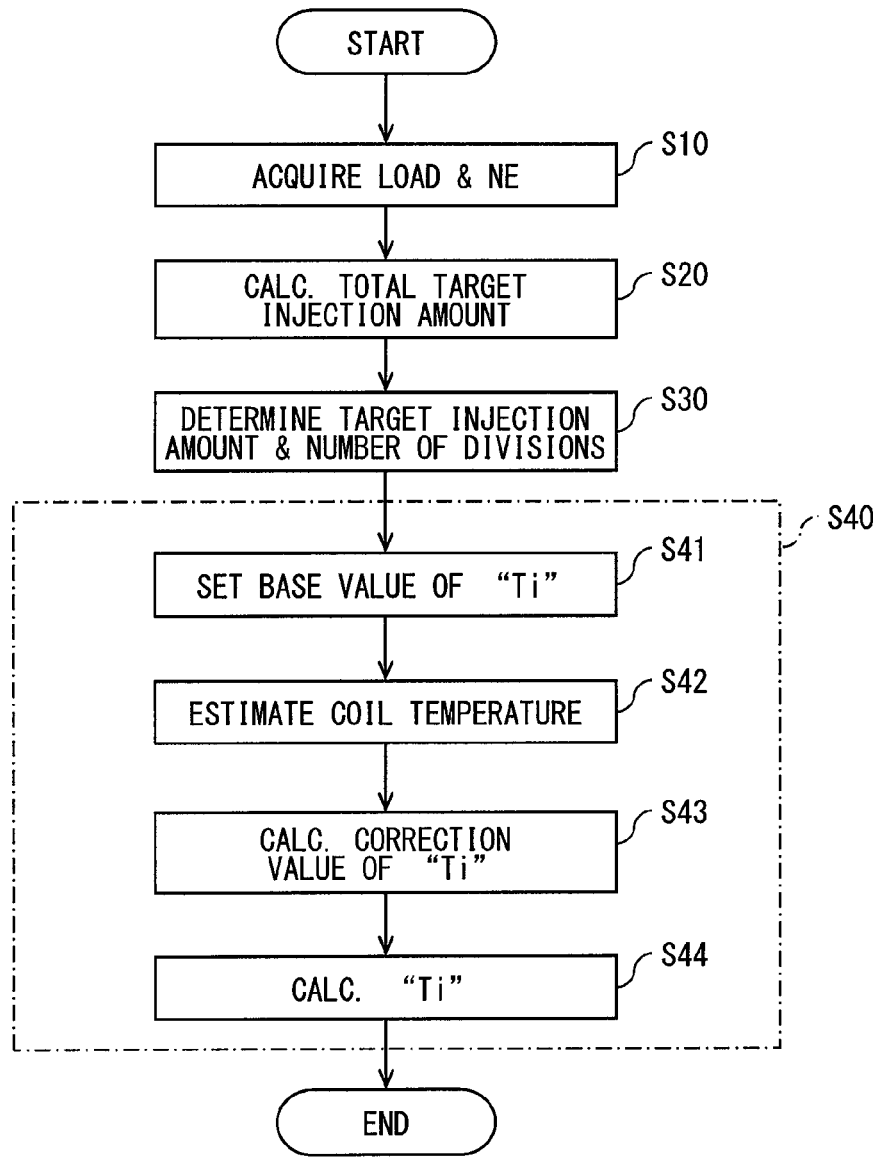
FIG. 6 is a flow chart illustrating a process of calculating the energization time period according to the first embodiment.

FIG. 6 is a flow chart illustrating the process in which the microcomputer 21 repeatedly executes at a predetermined time cycle according to a program. At first, in step S10, the load and the number of rotations NE per unit time of the internal combustion engine, at the present time point are acquired. Specific examples of the load include a depression amount of an accelerator pedal which is manipulated by an operator, a flow rate of intake air, an intake-air negative pressure, and the like.

In the next step S20, the target value of the total amount of the fuel injected during a single fuel cycle with a single cylinder (the total target injection amount) is calculated, based on the load and the number of rotations NE which have been acquired. In the next step S30, the number of times of injections during a single fuel cycle, which is the number of divisions of the total target injection amount, and the target injection amount of the fuel through a single opening of the fuel injector 10 are determined, based on the calculated total amount of the injection. The sum of the target injection amounts of the fuel regarding the respective injections provided by the divisions in a single fuel cycle is coincident with the total target injection amount.

In the next step S40, the energization time period Ti is calculated for each target injection amount which has been set. Specifically, at first, in step S41, the base value of the energization time period Ti responsive to the target injection amount is set. Specifically, in a case where the operating temperature range is expected to be −30° C. to 200° C., a map relating to a Ti-q characteristic line at the center temperature therein is preliminarily stored in the microcomputer 21. Further, based on the map, the value of the energization time period Ti for the injection amount is set as the base value.

In the subsequent step S42, the temperature of the coil 13 is estimated. For example, the time period required for raising the coil current to the first target value I1 by the rise control portion 21a is highly related to the coil temperature. Therefore, the time period is detected, and the coil temperature is estimated based on this time period.

In the subsequent step S43, based on the estimated coil temperature, a correction value for the base value of the energization time period Ti is calculated. In the area B1 in which the energization time period Ti is set, in the partial area A1, the injection amount is increased as the temperature is higher, as illustrated in FIG. 4, the correction value is set to be such a value as to correct the base value to be shorter as the temperature is higher. In the subsequent step S44, the energization time period Ti is calculated by adding the correction value calculated in step S43 to the base value of the energization time period Ti set in step S41.

When the base value falls in the partial area A1, the correction value is calculated to correct the energization time period Ti. On the other hand, when the base value falls in the full-lift area A2, the change of the injection amount which is generated based on the temperature is extremely smaller. Therefore, when the base value falls in the full-lift area A2, the calculation of the correction value and the correction with the correction value are not performed.

The target injection amount and the number of divisions are set in step S30, such that the timing t31 of the completion of the energization time period Ti set in step S40 is timing later than the peak appearance range W1. In other words, the target injection amount is set such that the timing t31 of the completion is made to be timing later than the peak appearance range W1, by adjusting the number of divisions.

Further, the resistance value of the coil 13, the boosted voltage, and the first target value I1 are set, such that small injection amounts in the partial area A1 can be included in the range of setting of the target injection amount. In other words, the peak appearance range W1 is positioned in a longer energization time period Ti side, as the resistance value of the coil 13 is larger, the boosted voltage is smaller, or the first target value I1 is smaller. This may lead a condition where the partial area A1 does not exist in the later-timing side with respect to the peak appearance range W1. The resistance value of the coil 13, the boosted voltage, and the first target value I1 are set to prevent the occurrence of such a condition.

The microcomputer 21 executing the processing in step S40 corresponds to "an energization time period calculation portion". The microcomputer 21 executing the processing in step S30 corresponds to "a target injection amount setting portion".

According to the present embodiment having been described above, the target injection amount is set in step S30 in FIG. 6, such that the timing t31 of the completion of the energization time period Ti is timing deviated from the peak appearance range W1. Therefore, in performing the temperature correction on the base value of the energization time period Ti responsive to the target injection amount, it is possible to uniquely determine whether increase correction is performed or decrease correction is performed as the temperature gets higher. This can eliminate the necessity of changing over between performing increase correction and performing decrease correction as the temperature gets higher. The concern about inverting increases and decreases of corrections can be eliminated, thereby enabling control of the amount of fuel injection with higher accuracy.

Further, in the present embodiment, the target injection amount is set such that the timing t31 of the completion of the energization time period Ti is timing later than the peak appearance range W1. If the target injection amount is set such that the timing t31 of the completion is timing earlier than the peak appearance range W1, unlike the present embodiment, it is necessary that the peak appearance range W1 is made to be at sufficiently later timing. This requires that the resistance value of the coil 13 is made larger, the boosted voltage is made lower, and the first target value I1 is made smaller. This elongates the valve-opening response time period from the start of the energization to the start of the valve-opening operation of the valve body 12, thereby degrading the responsiveness of the operation of the fuel injector 10. In view of this fact, in the present embodiment, the timing t31 of the completion of the energization time period Ti is set to be timing later than the peak appearance range W1, which can avoid the problem of the degradation of the responsiveness.

Further, in the present embodiment, the following values are set so as to permit the range of setting of the target injection amount to include small injection amounts in the partial area A1, while satisfying the condition that the timing t31 of the completion is deviated from the peak appearance range W1. In other words, the resistance value of the coil 13 is set to be sufficiently smaller, the boosted voltage is set to be sufficiently higher, and the first target value I1 (namely the current peak value) is set to be sufficiently higher. With this configuration, the amounts of variations in the characteristic lines L1, L2, and L3 depending on the temperature are reduced in the partial area A1. Accordingly, the accuracy of the temperature correction in the partial area A1 can be improved.

The timing t20 at which the coil current has a peak value is coincident with the timing of the appearance of the change point Pf (see FIG. 3(c)) at which the electromagnetic attraction force changes to have a smaller rising inclination. Therefore, it can be said that the peak appearance range W1 is a change-point appearance range in which change point Pf of the electromagnetic attraction force can appear in the operating temperature range. Accordingly, setting the target injection amount such that the timing t31 of the completion of the energization time period Ti is deviated from the peak appearance range W1 means setting the target injection amount such that the completion timing t31 is timing deviated from the change-point appearance range.

Second Embodiment

In the first embodiment, the target injection amount is set in step S30 in FIG. 6, such that the timing t31 of the completion of the energization time period Ti is timing deviated from the peak appearance range. On the other hand, in the present embodiment, the target injection amount is set such that the timing t31 of the completion of the energization time period Ti is timing deviated from cross-point appearance ranges W2 and W3, which will be described later.

Figure 7:
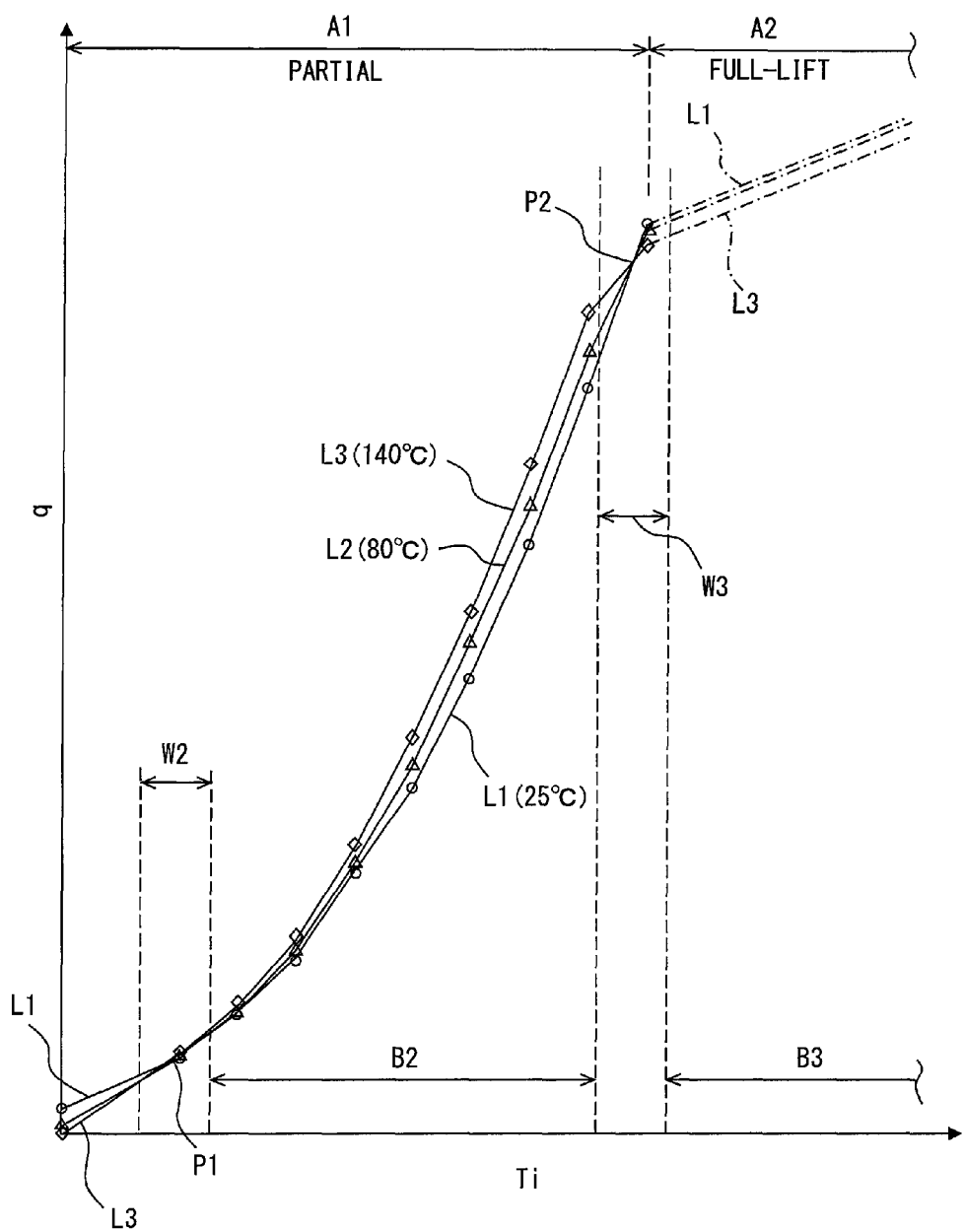
FIG. 7 is a view illustrating a cross-point appearance range, according to a second embodiment of the present disclosure.

As illustrated in FIG. 7, points at which characteristic lines L1, L2, and L3 intersect with each other are referred to as cross points P1 and P2, respectively. In FIG. 7, the point at which the characteristic lines L1 and L2 cross each other, the point at which the characteristic lines L1 and L3 cross each other, and the point at which the characteristic lines L2 and L3 cross each other are illustrated at the same positions (the positions indicated by reference characters P1 and P2). However, these cross points actually appear at different positions. Further, ranges where these cross points P1 and P2 can appear in accordance with the range of the operating temperature of the coil 13 are referred to as the cross-point appearance ranges W2 and W3. A specific example of the range of the operating temperature of the coil 13 includes an operating range of −30° C. to 200° C.

In the first embodiment, the range from which the timing t31 of completion deviates is only the peak appearance range W1. On the other hand, in the present embodiment, the cross-point appearance ranges W2 and W3 exist, that is, there are the two portions from which the timing t31 of completion is deviated. Specifically, the energization time period Ti is set in the areas indicated by reference characters B2 and B3 in FIG. 7. The cross-point appearance range W2 partially overlaps a portion of the peak appearance range W1. The cross-point appearance range W3 includes the boundary between the partial area A1 and the full-lift area A2.

According to the present embodiment having been described above, the target injection amount is set such that the timing t31 of the completion of the energization time period Ti is timing deviated from the cross-point appearance ranges W2 and W3. Therefore, in performing the temperature correction on the base value of the energization time period Ti responsive to the target injection amount, it is possible to uniquely determine whether increase correction is performed or decrease correction is performed as the temperature gets higher. This can eliminate the necessity of changing over between performing increase correction and performing decrease correction as the temperature gets higher, for the same target injection amount. The concern about inverting increases and decreases of corrections can be eliminated, thereby enabling control of the amount of fuel injection with higher accuracy.

Further, in the present embodiment, the following values are set so as to permit the range of setting of the target injection amount to include small injection amounts in the partial area A1, while satisfying the condition that the timing t31 of the completion is deviated from the cross-point appearance ranges W2 and W3. In other words, the resistance value of the coil 13 is set to be sufficiently smaller, the boosted voltage is set to be sufficiently higher, and the first target value I1 (namely the current peak value) is set to be sufficiently higher. With this configuration, the amounts of variations in the characteristic lines L1, L2, and L3 depending on the temperature are reduced in the partial area A1. Accordingly, the accuracy of the temperature correction in the partial area A1 can be improved.

Third Embodiment

Figure 8:
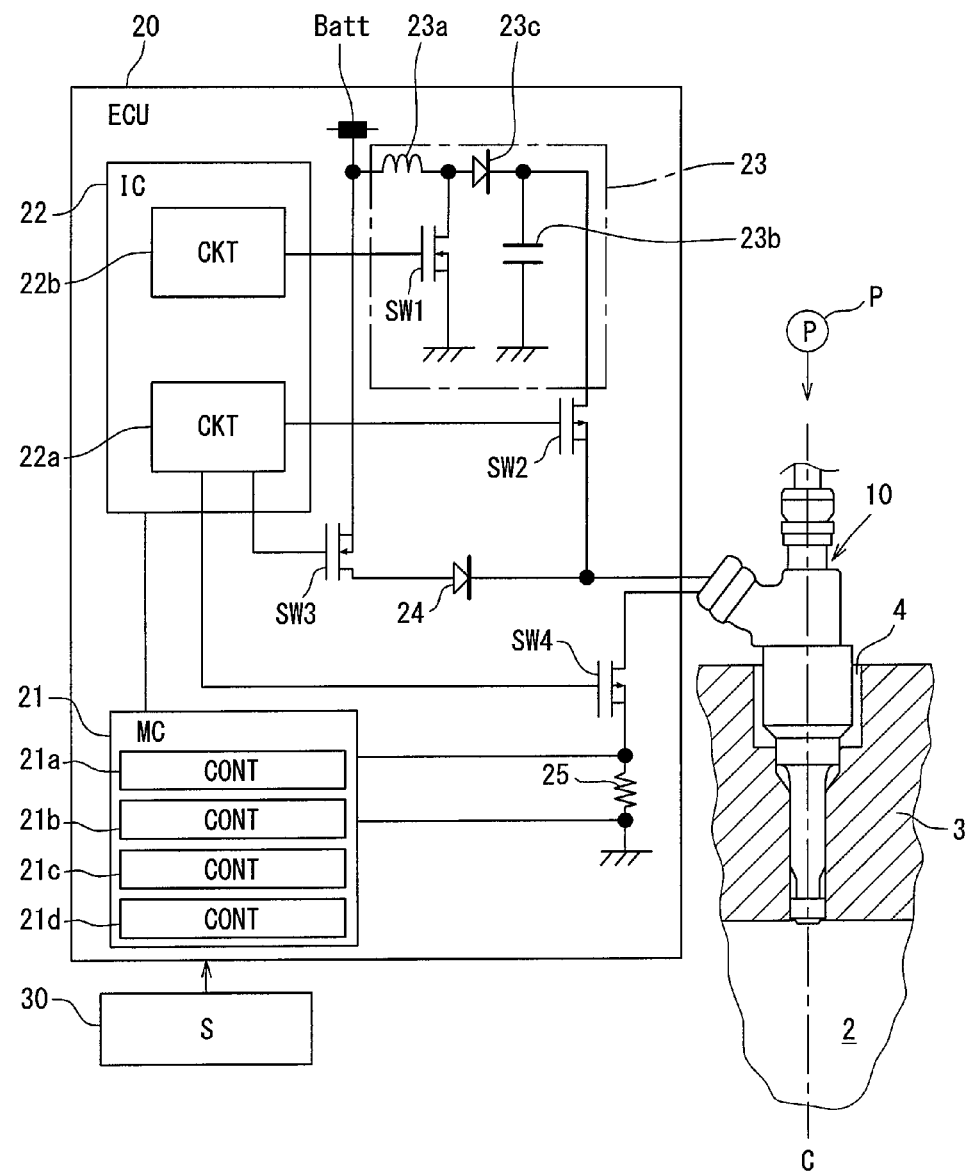
FIG. 8 is a schematic view illustrating a fuel injection system according to a third embodiment of the present disclosure.

The present embodiment is a modification of the first embodiment. In the present embodiment, as illustrated in FIG. 8, the microcomputer 21 provides a pre-charging control portion 21d which will be described later. The microcomputer 21 controls the IC 22 such that pre-charging for applying the battery voltage to the coil 13 is performed prior to the application of the boosted voltage to the rise control portion 21a. The microcomputer 21 performing this control corresponds to "the pre-charging control portion 21d".

Figure 9:
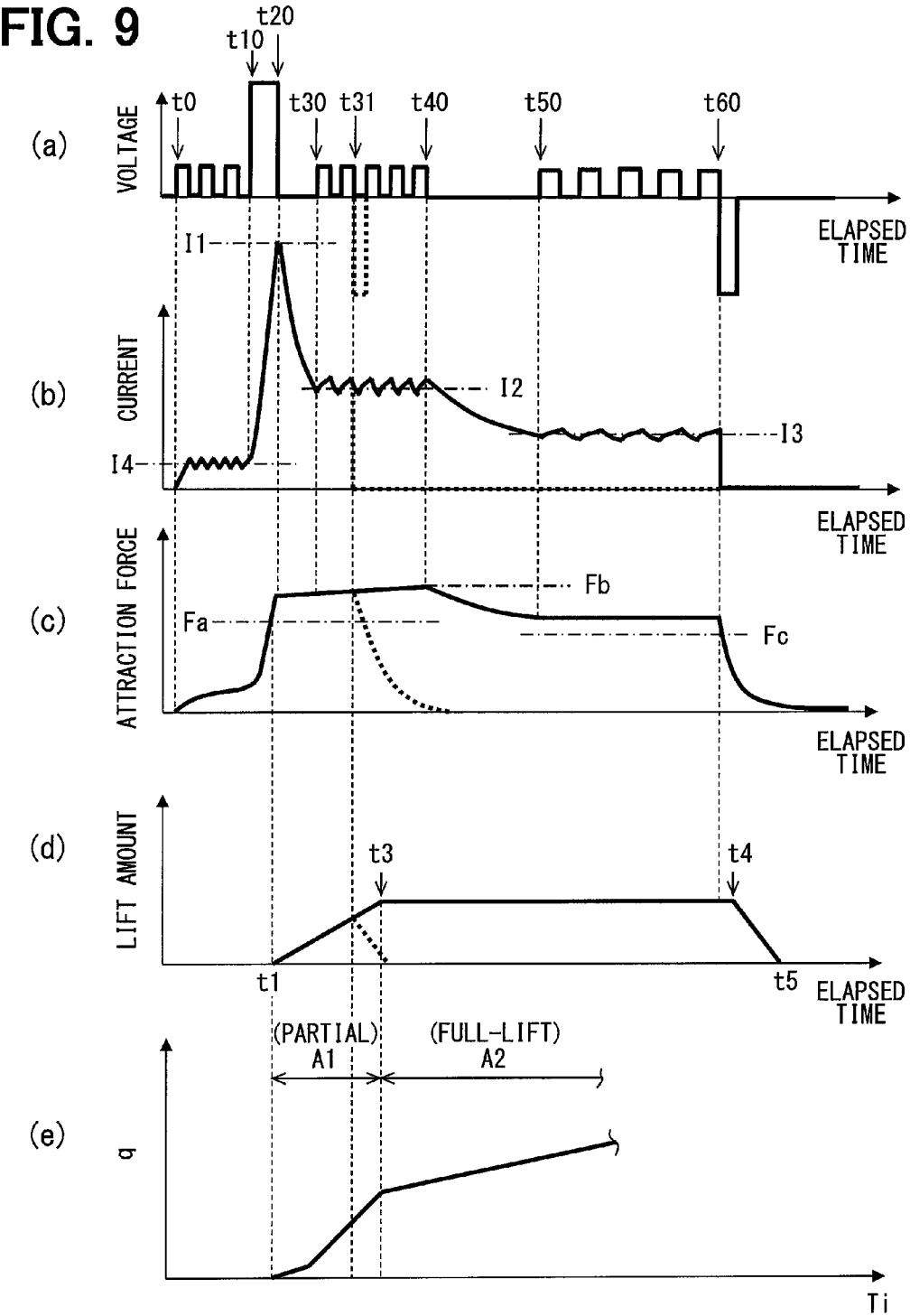
FIG. 9 is a chart illustrating changes in a voltage applied to a coil, a coil current, an electromagnetic attraction force, and a lift amount along with the elapse of time, and the relationship between an energization time period and an injection amount, in a case where injection control is performed according to the third embodiment.

When being controlled by the microcomputer 21 to perform pre-charging, the IC 22 causes the switching element SW4 to perform an ON-operation and also causes the switching element SW4 to perform ON/OFF-operations such that the coil current is maintained at a fourth target value I4 (see FIG. 9(a)). The fourth target value I4 is set to be a smaller value than the third target value I3 (see FIG. 9(b)). Specifically, the pre-charging control for applying the battery voltage to the coil 13 is started at a time point t0 which is set to be earlier by a predetermined time period than the time point t10 at which rising control is started. Thus, the attraction force starts rising, prior to the start of the rising control (see FIG. 9(c)).

Since the pre-charging control is performed, it is possible to shorten the boosted-voltage application time period required for raising the coil current to the first target value I1 in the rising control. Thus, the amount of heat generation in the booster circuit 23 can be reduced, thereby alleviating the risk of heat damage of the ECU 20.

Similarly to the first embodiment, in the present embodiment, the target injection amount is set such that the timing t31 of the completion of the energization time period Ti is timing deviated from the peak appearance range W1. The performance of pre-charging control shortens the time period required for raising the coil current to the first target value I1 in rising control. Thus, the timing of the appearance of the coil current peak value is earlier, and the peak appearance range W1 displaces to earlier timing. Accordingly, the setting area B1 illustrated in FIG. 4 extends in the earlier-timing side, which can reduce the minimum value of the energization time period Ti which can be set.

Therefore, according to the present embodiment having been described above, it is possible to eliminate the concern about inverting increases and decreases of corrections, thereby enabling control of the amount of fuel injection with higher accuracy. Furthermore, it is possible to reduce the minimum value of the target injection amount which can be set.

Fourth Embodiment

In the third embodiment, the pre-charging control portion 21d is provided and the target injection amount is set such that the timing t31 of the completion of the energization time period Ti is timing deviated from the peak appearance range W1. On the other hand, in the present embodiment, the pre-charging control portion 21d is provided similarly to in the third embodiment, and the target injection amount is set such that the timing t31 of the completion of the energization time period Ti is timing deviated from the cross-point appearance ranges W2 and W3, similarly to in the second embodiment.

Accordingly, the present embodiment can achieve the same effects as the third embodiment. In other words, it is possible to eliminate the concern about inverting increases and decreases of corrections, thereby enabling control of the amount of fuel injection with higher accuracy. Furthermore, it is possible to reduce the minimum value of the target injection amount which can be set.

Fifth Embodiment

Figure 10:
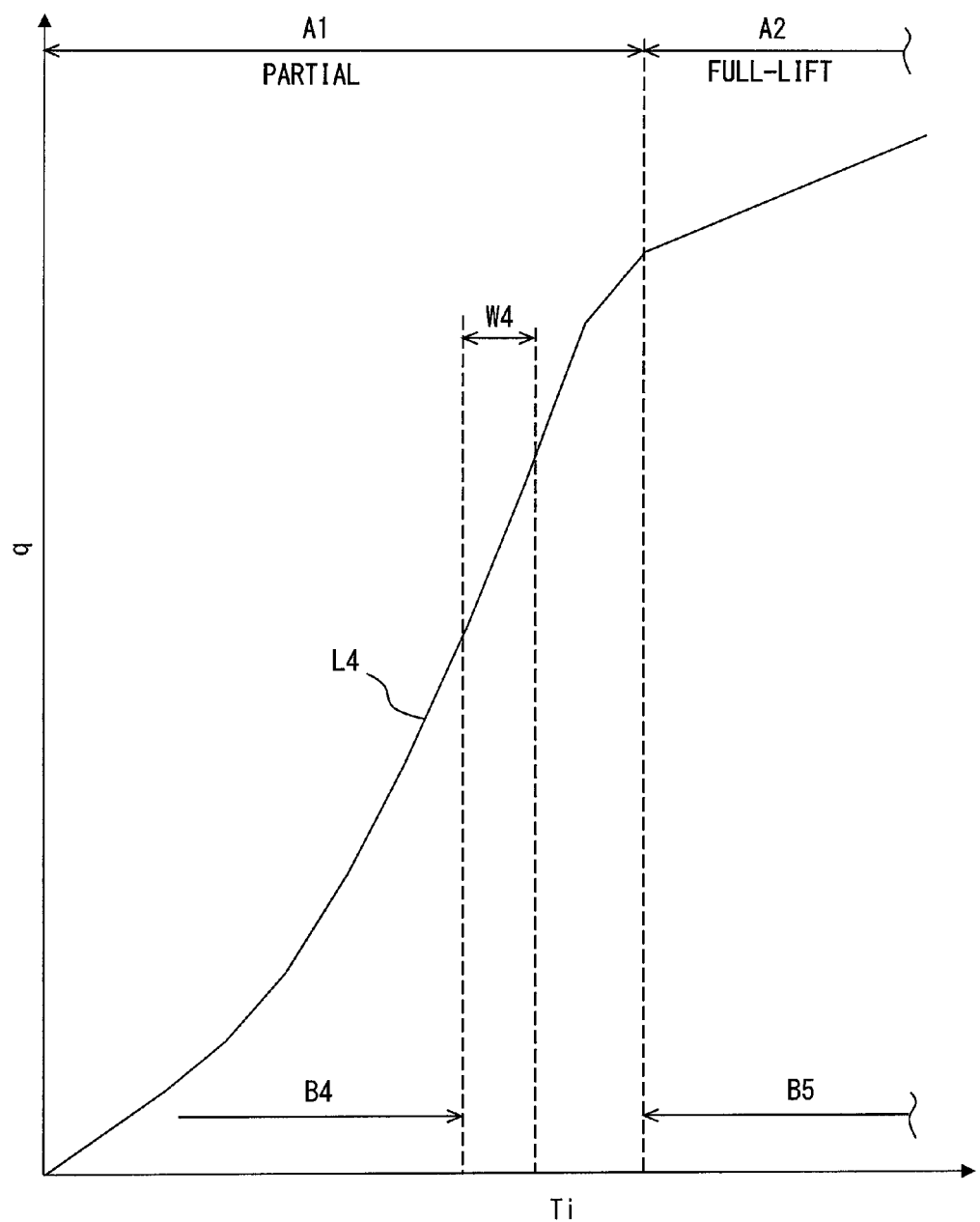
FIG. 10 is a view illustrating a peak appearance range, according to a fifth embodiment of the present disclosure.

In the first and second embodiments, the resistance value of the coil 13, the boosted voltage, and the first target value I1 are set to be the same values. Accordingly, the characteristic lines L1, L2, and L3 illustrated in FIG. 4 are the same as the characteristic lines L1, L2, and L3 illustrated in FIG. 7. On the other hand, in the present embodiment, the settings of the resistance value of the coil 13, the boosted voltage, and the first target value I1 are changed, and a characteristic line L4 having a different shape from that of FIGS. 4 and 7 is set as illustrated in FIG. 10. Therefore, the peak appearance range W1 illustrated in FIG. 4 is positioned in a shorter time-period side with respect to the center of the partial area A1, while a peak appearance range W4 illustrated in FIG. 10 is positioned in a longer time-period side with respect to the center of the partial area A1.

Further, in the first embodiment, the energization time period Ti is set in the area indicated by the reference character B1 in FIG. 4, such that the timing t31 of the completion of the energization time period Ti is later timing than the peak appearance range W1. On the other hand, in the present embodiment, the energization time period Ti is set in an area in the earlier-timing side (see a reference character B4) and in an area in the later-timing side (see a reference character B5), with respect to the peak appearance range W4. However, the area B5 in the later-timing side is set such that the area B5 does not include the partial area A1. Accordingly, the timing t31 of the completion is set in the area B4 in the partial area A1, while the timing t60 of completion is set in the area B5 in the full-lift area A2.

Other Embodiments

The present disclosure is not limited to the above-described embodiments and may be implemented by making various changes thereto as will be exemplified later. It is possible to combine parts which are specifically specified as being able to be combined with each other, in the respective embodiments, and it is possible to partially combine the embodiments with each other, provided that such combinations cause no obstacle particularly, even when such combinations are not specified.

For example, in the embodiments illustrated in FIGS. 3(a) to 3(e) and FIG. 10, the resistance value of the coil 13, the boosted voltage, and the first target value I1 are set, such that the peak appearance ranges W1 and W4 are positioned in the partial area A1. However, the resistance value of the coil 13, the boosted voltage, and the first target value I1 can be set such that the peak appearance ranges W1 and W4 are positioned in the full-lift area A2.

For example, the fuel injection controller may have an injection amount estimation portion for estimating an actual injection amount, and a feedback control portion which learns the deviation of the estimated actual injection amount from the target injection amount to feed back the deviation to the next setting of the energization time period Ti. Further, when the fuel injection controller does not perform such a feedback, the target injection amount may be set such that the timing t31, t60 of the completion of the energization time period Ti is timing deviated from the peak appearance ranges W1 and W4 or from the cross-point appearance ranges W2 and W3. A specific example of the injection amount estimation portion includes an injection amount estimation portion for detecting the timings when the valve body 12 has been actually opened and closed, and estimating the actual injection amount, based on the result of the detection, and based on the fuel pressure Pc detected by the fuel pressure sensor 30.

For example, in the embodiments illustrated in FIGS. 3(a) to 3(e) and FIGS. 9(a) to 9(e), the energization is temporarily stopped at the time point (t20) at which the coil current has reached the first target value I1 and, thereafter, the energization is restarted at the time point when the coil current has lowered to the second target value I2. That is, the time point (t20) when the coil current has reached the first target value I1 is the peak appearance timing. However, at the time point at which the coil current has reached the first target value I1, the energization may be continued by changing over from the boosted voltage to the battery voltage, and the raised coil current may be maintained at the first target value I1 for a predetermined time period. In this case, the timing of changing over from the boosted voltage to the battery voltage corresponds to the peak appearance timing.

As illustrated in FIG. 1, the fuel injector 10 according to the embodiments is mounted in the cylinder head 3, however, the present invention may be also applied to a fuel injector mounted in a cylinder block. Further, in the embodiments, the present invention is applied to the fuel injector 10 incorporated in an ignition-type internal-combustion engine (gasoline engine), the present invention may be also applied to a fuel injector incorporated in a compression self-ignition type internal-combustion engine (diesel engine). Further, in the embodiments, the fuel injector for directly injecting a fuel into the combustion chamber 2 is subjected to control, but a fuel injector for injecting a fuel into an intake pipe may be subjected to control.

As the pressure Pc of the fuel supplied to the fuel injector 10 is higher, a larger force is required for opening the valve. Therefore, the first target value I1 and the second target value I2 may be variably set such that the first target value I1 and the second target value I2 are set to be higher values, as the fuel pressure Pc is higher. Alternatively, these target values I1 and I2 may be fixed to pre-set values, regardless of the supplied fuel pressure.

The invention claimed is:

1. A fuel injection controller for a fuel injector adapted to perform a valve-opening operation of a valve body through electromagnetic attraction force generated by energization of a coil, the fuel injector injecting a fuel for use in combustion in an internal combustion engine, the fuel injection controller comprising:
   a target injection amount setting portion adapted to set a target injection amount of the fuel through a single opening of the fuel injector;
   an energization time period calculation portion adapted to set a base value of an energization time period of the coil responsive to the target injection amount and to correct the base value according to a temperature of the coil to calculate the energization time period;
   a booster circuit adapted to boost a battery voltage; and
   a rise control portion adapted to apply a boosted voltage, which is a voltage boosted by the booster circuit, to the coil, along with start of the energization time period, and to raise an current flowing through the coil to a predetermined threshold value;
   wherein
   a peak appearance range is defined as a range which includes a boundary between an increase area in which the injection amount decreases as the temperature of the coil is higher and an increase area in which the injection amount increases as the temperature of the coils is higher, and
   the target injection amount setting portion sets the target injection amount such that timing of completion of the energization time period is timing later than the peak appearance range, in a case that the valve body is positioned at a partial area.

2. The fuel injection controller according to claim 1, wherein
   the target injection amount setting portion sets the target injection amount such that the timing of completion of the energization time period is timing later than the peak appearance range.

3. The fuel injection controller according to claim 1, wherein
   in a case where pre-charging for applying the battery voltage to the coil is performed prior to the application of the boosted voltage by the rise control portion, the target injection amount setting portion sets the target injection amount such that the timing of completion of the energization time period is timing deviated from the peak appearance range.

4. A fuel injection controller for a fuel injector adapted to perform a valve-opening operation of a valve body through electromagnetic attraction force generated by energization of a coil, the fuel injector injecting a fuel for use in combustion in an internal combustion engine, the fuel injection controller comprising:
   a target injection amount setting portion adapted to set a target injection amount of the fuel through a single opening of the fuel injector;
   an energization time period calculation portion adapted to a base value of an energization time period of the coil responsive to the target injection amount and to correct the base value according to a temperature of the coil to calculate the energization time period;
   a booster circuit adapted to boost a battery voltage;
   a rise control portion adapted to apply a boosted voltage, which is a voltage boosted by the booster circuit, to the coil, along with start of the energization time period, and to raise an current flowing through the coil to a predetermined threshold value;
   wherein
   when a point where characteristic lines indicating relationships between the energization time period and the injection amount at different coil operating temperatures are intersected with each other is defined as a cross point, at which an increase area in which the injection amount decreases as the temperature of the coil is higher and an increase area in which the injection amount increases as the temperature of the coil is higher are switched to each other, and a range where the cross point appears in accordance with a range of the operating temperature of the coil is defined as a cross-point appearance range,
   the target injection amount setting portion sets the target injection amount such that timing of completion of the energization time period is timing deviated from the cross-point appearance range in a case that the valve body is positioned at a partial area.

5. The fuel injection controller according to claim 4, wherein
   in a case where pre-charging for applying the battery voltage to the coil is performed prior to the application of the boosted voltage by the rise control portion,
   the target injection amount setting portion sets the target injection amount such that the timing of completion of the energization time period is timing deviated from the cross-point appearance range.

6. The fuel injection controller according to claim 1, wherein
   a resistance value of the coil, the boosted voltage, and the threshold value are set such that a range of the target injection amount set by the target injection amount setting portion includes a small injection amount with which the valve body starts a valve-closing operation before reaching a maximum valve-opening position, after the start of the valve opening operation.

* * * * *